United States Patent
Hayashi et al.

[11] Patent Number: 6,166,793
[45] Date of Patent: Dec. 26, 2000

[54] REFLECTIVE LIQUID CRYSTAL DISPLAY WITH ANGULARLY SELECTIVE LIGHT DIFFUSER DIRECTLY ON REFLECTOR

[75] Inventors: Narutoshi Hayashi, Toyonaka; Nobuyuki Kurata, Habikino, both of Japan

[73] Assignee: Sumitomo Chemical Company, Limited, Osaka, Japan

[21] Appl. No.: 09/090,923

[22] Filed: Jun. 5, 1998

[30] Foreign Application Priority Data

Jun. 6, 1997 [JP] Japan ............................ 9-149268
Feb. 3, 1998 [JP] Japan ............................ 10-022273

[51] Int. Cl.[7] .................................... G02F 1/1335
[52] U.S. Cl. ................................. 349/113; 349/112
[58] Field of Search ............................. 349/112, 113

[56] References Cited

U.S. PATENT DOCUMENTS

| | | | |
|---|---|---|---|
| 5,128,787 | 7/1992 | Blonder | 359/70 |
| 5,526,149 | 6/1996 | Kanbe et al. | 349/113 |
| 5,694,189 | 12/1997 | Nakamura et al. | 349/143 |
| 5,724,111 | 3/1998 | Mizobata et al. | 349/112 |
| 5,818,554 | 10/1998 | Hiyama et al. | 349/113 |
| 5,936,688 | 8/1999 | Tsuda et al. | 349/113 |

FOREIGN PATENT DOCUMENTS

| | | |
|---|---|---|
| 0 843 195 A1 | 5/1998 | European Pat. Off. |
| 62-91918 | 4/1987 | Japan . |
| WO97/05521 | 2/1997 | WIPO . |

*Primary Examiner*—Kenneth Parker
*Attorney, Agent, or Firm*—Sughrue, Mion, Zinn, Macpeak & Seas, PLLC

[57] ABSTRACT

A reflective liquid crystal display and a light diffusion reflector are provided, comprising at least one light diffusion layer and a reflector having one or two reflection angles which exhibit maximums in an angle-dependent distribution curve of reflected light intensity which is generated when light is irradiated on the reflector surface from a direction at an angle of −45 degrees from a normal line to the reflector surface, in which at least one angle exhibiting the maximum deviates by at least 5 degrees from the angle of +45 degrees from the normal line to the reflector surface. The reflective liquid crystal display exhibits a bright image and an excellent visibility of images.

17 Claims, 5 Drawing Sheets

HORIZONTAL PLANE (SUBSTRATE)

HORIZONTAL PLANE (SUBSTRATE)

REFLECTIVE LIQUID CRYSTAL DISPLAY WITH ANGULARLY SELECTIVE LIGHT DIFFUSER DIRECTLY ON REFLECTOR

FIELD OF THE INVENTION

The present invention relates to a reflective liquid crystal display comprising a light diffusion layer and a reflector having specific distribution characteristics of reflected light intensity, and relates to a light diffusion reflector comprising said reflector and a light diffusion layer.

BACKGROUND OF THE INVENTION

In these days, liquid crystal displays have been used in various fields, for example, notebook type word processors, personal computers, electronic pocket data books, portable information terminals, amusement equipment, stationery goods, portable telephones, and the like. In particular, reflective liquid crystal displays are widely used for portable equipment.

As reflective liquid crystal displays, those having the structure followed in the order of "a first polarizer, a liquid crystal cell, a second polarizer and a reflector" (,wherein a twisted nematic (TN) cell or a super twisted nematic (STN) cell is employed as the liquid crystal cell), and those having the structure followed in the order of "a liquid crystal cell and a reflector" (, wherein a guest-host (GH) cell is employed as the liquid crystal cell) have been used.

However, their reflective liquid crystal displays can not give a sufficient bright image and a sufficient visibility of images when the images are viewed from a specific angle wherein the reflection of external light on the outermost surface, for example, on the first polarizer surface is avoided.

SUMMARY AND OBJECT OF THE INVENTION

The present inventors have been intensely researched for a reflective liquid crystal display exhibiting a bright image and having an excellent visibility of images, and as a result found that a reflective liquid crystal display exhibiting a bright image and having an excellent visibility of images is obtained by combining a reflector having specific distribution characteristics of reflected light intensity with a light diffusion layer. The present invention has been accomplished on the basis of the above findings.

Thus, the present invention provides a reflective liquid crystal display and a light diffusion reflector comprising at least one light diffusion layer and a reflector having one or two reflection angles which exhibit maximums in an angle-dependent distribution curve of reflected light intensity which is generated when light is irradiated on the reflector surface from a direction at an angle of −45 degrees from a normal line to the reflector surface, in which at least one angle exhibiting the maximum deviates by at least 5 degrees from the angle of +45 degrees from the normal line to the reflector surface.

The present invention also provides a reflective liquid crystal display comprising the above-described reflector and at least one light diffusion layer selected from a light diffusion layer, which comprises a resin and an inorganic fine particle and/or an organic fine particle, and a light diffusion layer which scatters the incident light from a direction at a specific angle.

Further, the present invention provides a light diffusion reflector comprising the above-descried reflector and at least one light diffusion layer selected from a light diffusion layer, which comprises a resin and an inorganic fine particle and/or an organic fine particle, and a light diffusion layer which scatters the incident light from a direction at a specific angle.

The reflective liquid crystal display of the present invention and the reflective liquid crystal display obtained by using the light diffusion reflector of the present invention; both exhibit a bright image and an excellent visibility of images even when the images are viewed from an angle wherein reflection of external light is avoided.

DETAILED DESCRIPTION OF THE PREFERRED EMBODIMENTS

The reflector in the present invention has one or two reflection angles which exhibit maximums in an angle-dependent distribution curve of reflected light intensity which is generated when light is irradiated on the reflector surface from a direction at an angle of −45 degrees from a normal line to the reflector surface, in which at least one angle exhibiting the maximum deviates by at least 5 degrees from the angle of +45 degrees from the normal line to the reflector surface. The angle-dependent distribution curve of reflected light intensity, which is generated when light is irradiated on the reflector surface from a direction at an angle of −45 degrees from a normal line to the reflector surface, is a curve obtained by plotting an intensity of a reflected light against an angle of the reflected light when light is irradiated onto the reflector from a direction at an angle of −45 degrees from the normal line.

Figure 1:
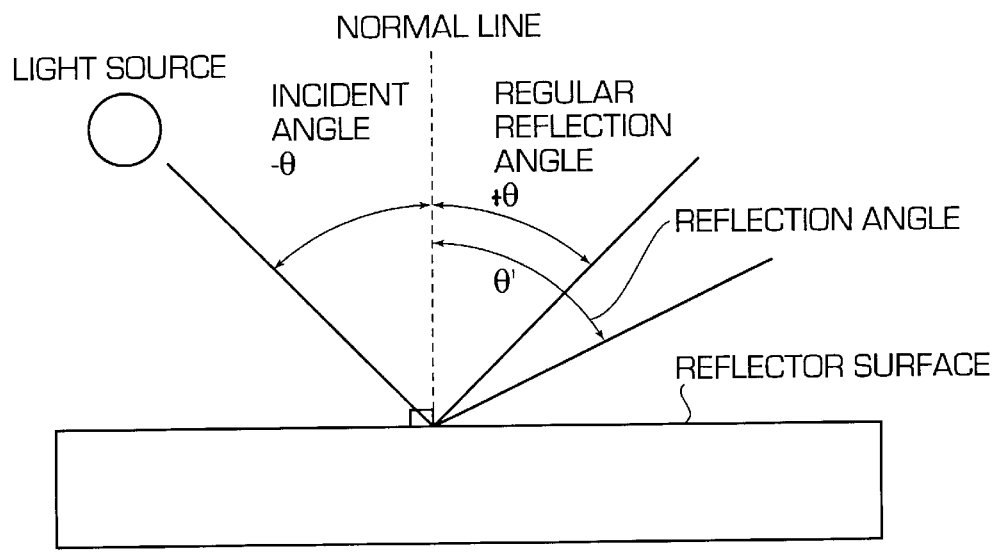
FIG. 1 is a view showing relation between an angle of incident light to a reflector and an angle of reflected light thereof to the reflector.

The reflective characteristics, namely the distribution characteristics of reflected light intensity, of the reflector of the present invention and the reflector which is used in the reflective liquid crystal display of the present invention differ from those of the previous reflector of which the surface is plain. As shown in FIG. 1, when an incident angle of light on the reflector from a normal line to the reflector surface is represented by −θ degrees (0 degree<|θ|<90 degrees), the regular reflection angle thereof is +θ degrees. The reflector in the present invention satisfies the following condition:

When a distribution of reflected light intensity corresponding to the incidence angle of −θ degrees is measured for each reflection angle, there are one or two reflection angle exhibiting a maximum intensity of reflected light and at least one reflection angle of θ' degrees exhibiting the maximum intensity of reflected light (0 degree<|θ'|<90 degrees) satisfies the relationship |θ−θ'|≧5 degrees.

That is, when the distribution of reflected light intensity corresponding to the incidence angle of, for example, −45 degrees is measured for each reflection angle the reflector in the present invention has one or two reflection angles which exhibit maximums in angle-dependent distribution curve of reflected light intensity, in which at least one angle exhibiting the maximum deviates by at least 5 degrees from the regular reflection angle thereof of +45 degrees.

If $|\theta-\theta'|$ degrees is less than 5 degrees, the visibility of the images deteriorates, since the glares caused by the reflection of external light on the outer surface of a liquid crystal display are also visible over the images, when the reflector is incorporated in the liquid crystal display and the screen is viewed from an angle at which the large reflected light intensity is obtained.

When the number of the angles exhibiting the maximums of the reflected light intensity is three or more, the reflected light intensity at an angle exhibiting each maximum decreases, since the reflected light is scattered. Thus, good visibility of the images cannot be expected, when the reflector having three or more reflection angles which exhibit maximums is incorporated in a liquid crystal display.

To reflect light properly, a slant angle is set on the surface of a reflector. When two or more light sources are used and the liquid crystal display is used with fixing the liquid crystal display and a viewing angle, light beams from two or more light sources are respectively reflected at different angles and are focused on the eye of a viewer. For this purpose, at least four different slant angles should be set on the reflector surface. In this case, the number of the angles exhibiting the maximum intensity of the reflected light is three or more. A spatial relationship between a light source and a liquid crystal display cannot be uniformly defined when the reflective liquid crystal display of the present invention is used for portable equipment. The liquid crystal display is used with setting a viewing angle in accordance with the angle of reflected light of the light source through the adjustment of the angle between the viewing direction and the surface of the liquid crystal display placed on a palm or a desk, so that the large reflection light intensity is obtained, wherever the light source is present. Therefore, for the improvement of the visibility, it is important to increase reflected light intensity as much as possible at the angles exhibiting the maximum intensity of the reflected light. Accordingly, the number of the angles exhibiting the above maximums should be one or two.

Figure 2:
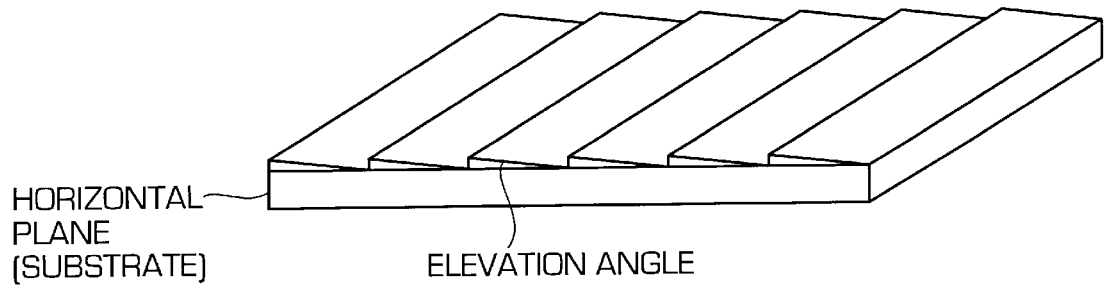
FIGS. 2 to 5 are perspective views respectively showing each one example of a reflector of in present invention.
Figure 3:
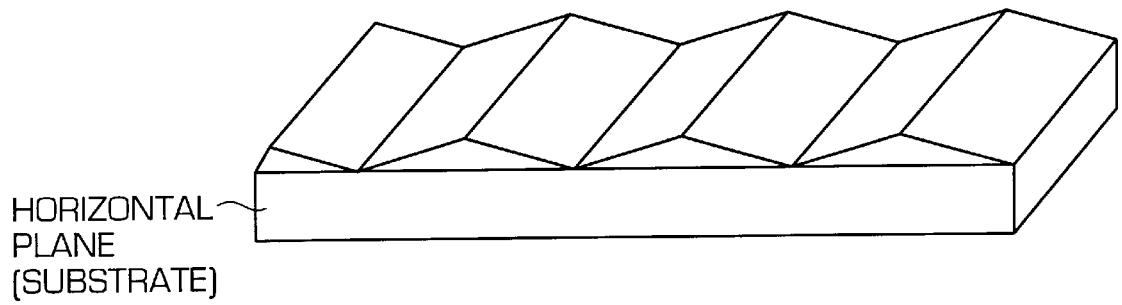

Examples of the reflectors, which satisfy the relationship of $|\theta-\theta'|\geq 5$ degrees and have one or two reflection angles exhibiting the maximums in the distribution of the reflected light, are as follows:

(1) A reflector, of which a surface part has a shape such that triangular prisms are arranged in adjacent to each other in their ridge directions and the vertical cross sections of the prisms to the ridge direction form a saw-teeth shape consisting of triangles, and of which an angle of elevation of each triangle, that is, an angle between the oblique-side appearing on the cross section and the base-side of the triangle which is in parallel with the horizontal plane of the reflector, is 2.5 degrees or more. An example of this reflector is shown in FIG. 2 and FIG. 3.

Figure 4:
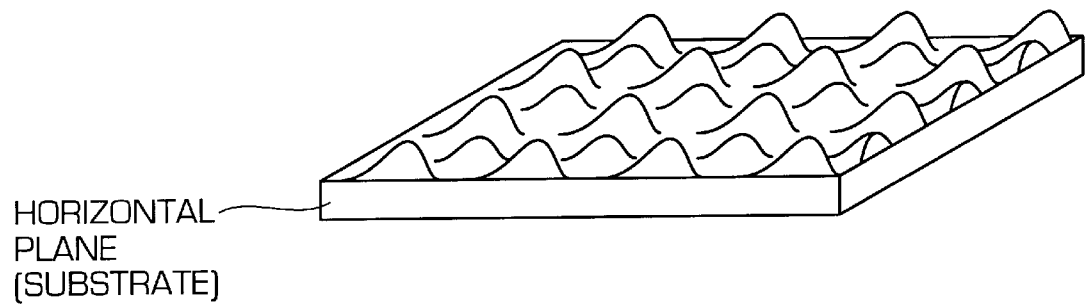

(2) A reflector, of which a surface part comprises depressions and/or projections which are densely formed over the entire reflector surface, with each of depression and/or projection having an asymmetric cross section at least in one direction, in which the depressions and/or projections have substantially the same shape and are arranged in substantially the same direction one another, and of which an angle between each depression or projection and the surface of the reflector, that is, an elevation angle for the projection, or a depression angle for the depressions, is between 2.5 degrees and 90 degrees, preferably between 2.5 degrees and 45 degrees, more preferably between 2.5 degrees and 10 degrees. An example of this reflector is shown in FIG. 4.

Figure 5:
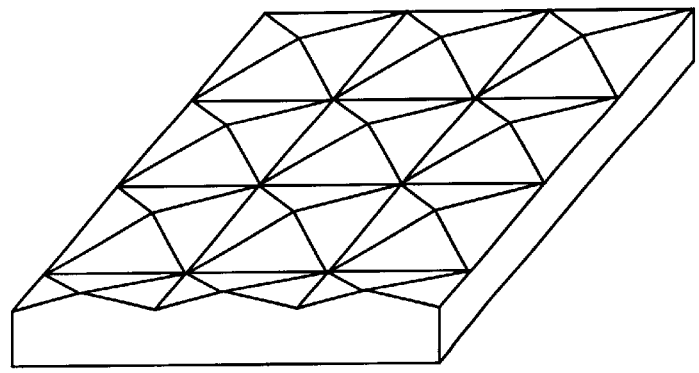

(3) A reflector, of which a surface part has a shape such that pyramids are clustered together with their base-sides being in contact with each other, all the pyramids have substantially the same shape and are arranged in the same direction one another, and the vertical cross sections of the pyramids to their-bases including the highest points of each pyramid arranged in the same direction form a saw-teeth shape consisting of congruent or similar triangles, and of which an elevation angle of each triangle, that is, an angle between the oblique-side and base-side of the triangle appearing in the above cross section, is 2.5 degrees or more. An example of this reflector is shown in FIG. 5.

In these reflectors, each of the above-described triangular prisms, depression part, projection part and pyramids may have an acute or round shape at the top.

These reflectors all have distribution characteristics of reflected light intensity such that the reflectors have one or two reflection angles which exhibit maximums in an angle-dependent distribution curve of the reflected light intensity which is generated when light is irradiated on the reflectors surface from a direction at an angle of −45 degrees from a normal line to the reflector surface, in which at least one angle exhibiting the said maximum deviates by at least 5 degrees from the regular reflection angle of +45 degrees from the normal line to the reflector surface.

A pitch of the triangles in the cross-section in the above-described reflector (1) and (3), namely the length of one-side of the triangles parallel to the surface of the reflector (horizontal surface), in other words, the length of base-side of the triangle, is not particularly restricted. The pitch is preferably in the range of from about 10 μm to about 500 μm because a regular shape can be formed, and streaks are less remarkable. When the pitch is less than about 10 μm, a regular form of the triangles is not easily obtained, and when it is over about 500 μm, the stripes are remarkable, undesirably. It is also preferable that the pitch of the projection and the depressions of the above-described reflector (2) is in the range of from about 10 μm to about 500 μm.

When reflector of the present invention is incorporated in the liquid crystal display, a pitch of pixels of the liquid crystal cells and that of the triangles of the reflector may interfere each other, so that a Moiré pattern may be formed. To prevent the formation of the Moiré pattern, it is practically preferable to (a) allow the pitch of the pixels of the liquid crystal cells and that of the triangles of the reflector to coincide, (b) differ lengths of the base-sides, which is the pitch of the triangles of the reflector, of the adjacent triangles one another, or (c) allow the pitch of the triangles to be 100 μm or less.

In FIG. 2 showing an example of the above-described reflector (1), the surface part thereof has a shape such that triangular prisms are arranged in adjacent to each other in their ridge directions and the vertical cross sections of the prisms to the ridge direction form a saw-teeth shape consisting of triangles, and the elevation angle of the triangle is 7.5 degrees and 90 degrees and the apex angle is 82.5 degrees. In FIG. 3 showing another example of the above-described reflector (1), the surface part thereof has a shape such that triangular prisms are arranged in adjacent to each other in their ridge directions and the vertical cross sections of the prisms to the ridge direction form a saw-teeth shape consisting of isosceles triangles, and the elevation angle of the triangle is 7.5 degrees and the apex angle is 165 degrees.

Figure 6:
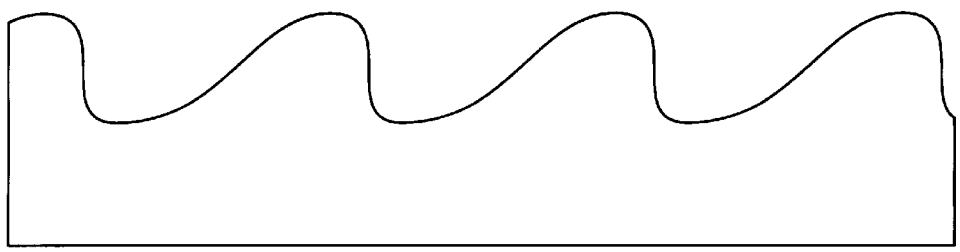
FIGS. 6 to 9 are sectional views respectively showing each one example of a reflector of in present invention.
Figure 7:
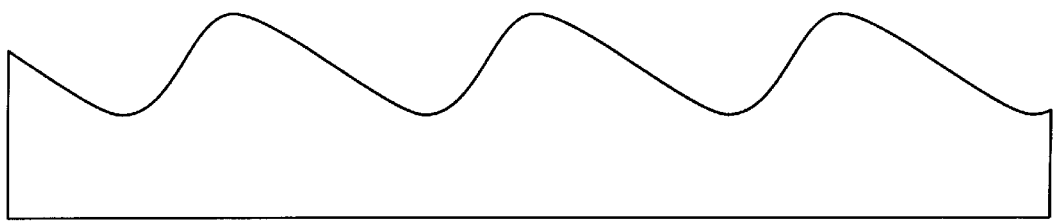
Figure 8:
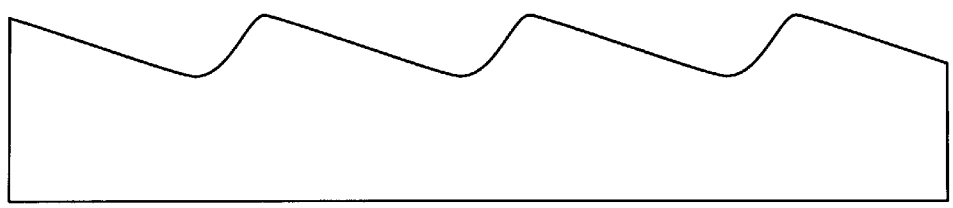
Figure 9:
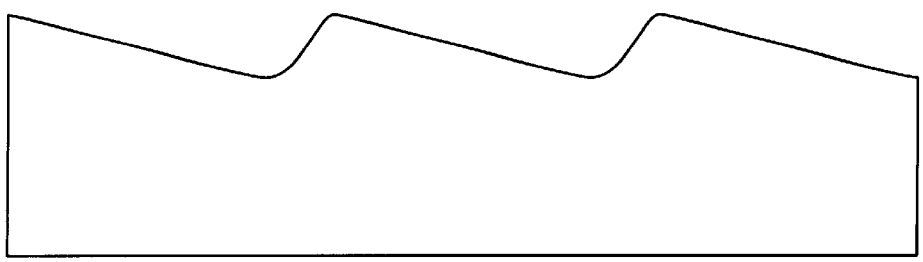

In the reflector (2), it is necessary that depressions and projections are formed densely over the entire reflector surface. When the surface part of the reflector has a small number of the depressions and projections and has a lot of plane parts, the effect of the present invention does not tend to be obtained. The shape of the depression or projection is such that the cross section in at least one direction has asymmetrical form. Symmetrical depression and projection such as semi-sphere shape of which the cross section in any direction shows semi-circle shape are not preferable. The oblique face of the depression and projection may be a curved face (, for example, as shown in FIGS. 6 and 7) or a straight face (, for example, as shown in FIGS. 8 and 9).

In FIG. 5 showing the reflector (3), the surface part thereof has a shape such that pyramids are clustered together with their base-sides being in contact with each other, all the pyramids have substantially the same shape and are arranged in the same direction one another, and the vertical cross sections of the pyramids to their-bases including the highest points of each pyramid arranged in the same direction form a saw-teeth shape consisting of congruent or similar triangles, and the elevation angle of the triangle is 7.5 degrees and the apex angle is 165 degrees.

Examples of the substrate of the reflector of the present invention include plastic films such as a polyethylene terephthalate film, a polyester film, a polycarbonate film, a polyacryl film and a polyolefin film, metal plates such as an aluminum plate and a copper plate, and glass plates and the like.

The thickness of the substrate, excluding height of the unevenness in the reflector, is not particularly restricted and, for example, is in the range of from about 10 $\mu$m to about 5 mm.

Examples of the method for forming the surface of the reflector substrate in the above-described shape are as follows:

A method comprising forming a negative shape of a desired one on a roll, and forming the shape on the substrate surface using the roll by a roll transfer method.

A method comprising forming a negative shape of a desired one on a roll, applying and filling an ultraviolet ray or an electron-beam curable resin in the depressions of the negative shape on the roll, supplying the substrate film on the roll with the liquid resin between them, irradiating ultraviolet ray or electron-beam to cure and adhere the curable resin on the substrate film, and removing the substrate film, to which the cured resin is adhered, from the roll (see Japanese Patent Application Laid-Open (JP-A) No.3-223883 and JP-A-6-324205).

A solvent casting method comprising forming a negative shape of a desired shape on a casting belt, and imparting the desired shape to the substrate during casting.

On the substrate surface of the reflector, a light reflection layer is usually provided for preventing transmission of an incident light through the reflector and for allowing desirable reflection. For providing a light reflection layer, metal having high reflectance such as aluminum and silver may be vapor-deposited on the substrate. A method for vapor-depositing the metal having high reflectance is not particularly restricted providing the distribution characteristics of the reflected light intensity on the reflector surface do not change by the vapor-deposition and the condition of $|\theta-\theta'|\geq 5$ degrees is satisfied. For example, any conventional method, which is employed for forming a metal film, such as a vacuum vapor-deposition method, sputtering method and ion-plating method can be suitably selected for use depending on the kind of the substrate. A thickness of the deposited metal layer is not restricted and is usually in the range of from about 50 nm to about 100 nm.

When the vapor-deposition is conducted using silver as metal having high reflectance, a protective layer may be preferably provided on the surface of the vapor-deposited layer for preventing degradation of the vapor-deposited layer.

The protective layer is not particularly restricted, and examples thereof include coated films of an acryl resin, an epoxy resin, a polyester resin, an urethane resin or an alkyd resin. The protective layer can be applied by common methods such as a roll coating method, a gravure coating method and a spray coating method. A film of an inorganic substance such as $SiO_2$ can be used, as well. A thickness of the protective layer is not particularly restricted, and is usually in the range of from about 5 nm to about 10 $\mu$m.

When a metal plate having high reflectance such as an aluminum plate is used as a substrate of the reflector, the light reflection layer may be provided on the surface thereof for further improving the reflectance, however, it may also be used as a reflector as it is without proving the light reflection layer.

In the reflective liquid crystal display and the light diffusion reflector of the present invention, a light diffusion layer is provided on the observed side of the reflector for suitably scattering a reflected light from the light reflection layer or from the reflector surface. The light diffusion layer in the present invention can be provided by, for example, a method in which a fine particle is applied using a resin binder, a method in which a haze film is placed and the like.

When a light diffusion layer is placed by the method in which a fine particle is applied using a resin binder, examples of the fine particle include inorganic fine particles such as silica, calcium carbonate, pearl pigments such as natural mica or synthetic mica having a surface coated with titanium oxide and fine particles having pearl-like gloss such as plate-form scale foil and hexagonal plate-form basic lead carbonate; and organic fine particles such as acrylic beads such as a polymethyl methacrylate bead, polystyrene-based beads such as a cross-linked polystyrene bead, polycarbonate-based beads, melamine-formalin-based beads, benzoguanamine-formalin-based beads, organic silica-based beads; and the like. A particle size of the fine particle is not particularly restricted and is usually in the range of from about 0.5 $\mu$m to about 50 $\mu$m, preferably of from about 1 $\mu$m to about 20 $\mu$m, more preferably of from about 1 $\mu$m to about 10 $\mu$m. Such fine particles are respectively used alone or in combination of two or more.

The resin binder is not particularly restricted, and examples thereof include acrylic resins, urethane-based resins, epoxy-based resins, polyester-based resins, alkyd resins and the like. These resin binders may have an adhesive property.

The combination of the fine particle with the resin binder is suitably selected, and may be preferably selected so that a difference in refractive indexes of them is in the range of from about 0.01 to about 0.5. The mixing ratio of the fine particle to the resin binder is not restricted and an amount to be used of the fine particle is usually in the range of from 0.01 to 70 parts by weight based on 100 parts by weight of the resin binder.

When the fine particle is applied using the resin binder, for example, the fine particle and the resin binder are mixed, and then, the applying may be conducted by a common method such as a roll coating method, a gravure coating method and a spray coating method. A thickness of the light diffusion layer is usually in the range of from about 1 μm to about 100 μm, preferably of from about 5 μm to about 50 μm.

When a light diffusion layer is placed by the method in which a haze film is placed, the haze film is not particularly restricted providing a haze value thereof is in the range of from about 5% to about 99%. The light diffusion layer can be made of the same kind of the inorganic fine particle and/or organic fine particle, and the same kind of the resin. Examples of the film include followings: a film obtained by casting the resin prepared by mixing the inorganic fine particle and/or organic fine particle, a film obtained by applying, on the surface of a film, the resin prepared by mixing the inorganic fine particle and/or organic fine particle, a film obtained by subjecting the surface of the above films to emboss treatment, and in addition, a film obtained by heat-curing or light-curing of a mixture of resins having different refractive indexes, and the like. A thickness of the haze film is not particularly restricted providing hazing can be manifested, and is usually in the range of from about 1 μm to about 1 mm. A method for placing the haze film is not particularly restricted, and the film may be placed, for example, by a common method used when an acrylic adhesive is placed.

When a light diffusion layer is placed by a method in which a haze film is placed, it is preferably to use a film which scatters a incident light from specific incident angles, as the light diffusion layer. Examples of the preferable film include a film obtained by heat-curing or light-curing a mixture of resins having a different refractive index and the films which are described, for example, in Japanese Patent Application Laid-Open (JP-A) No. 3-107901 can be used, preferably. As the commercially available films, for example, "LUMISTY" manufactured by Sumitomo Chemical Co., Ltd., and the like are listed. A light diffusion layer made from such a film can scatter a light from specific incident angles, and can allow a light from other angles to transmit as it is. This specific incident angles is influenced by a light scattering ability determined by a composition of the haze film and the like, and the light scattering ability is specific to the composition of the haze film and the like. The extent of the ability can be suitably set by selecting the composition and the like of the film depending on a purpose for use of a liquid crystal display in which the haze film is incorporated.

The light diffusion layer made from the film which scatters an incident light from specific incident angles is usually placed so that only an incident light to the reflective liquid crystal display can be scattered. Since the reflective liquid crystal display is often used so that a light from upper side of the screen is let in, it is usually placed so that an incident light from angles tilted about 25 degrees to about 60 degrees from normal line to the display can be scattered.

It may also be permissible that two light diffusion layers made from the film which scatters an incident light from specific incident angles are used and one of them is placed to scatter a light from left upper side to the screen and the other one is placed to scatter a light from right upper side to the screen.

The film which scatters an incident light from specific incident angles is preferably placed so that a direction of a haze-change-axis of the haze film is adjusted to that of the above-described ridge of the reflector. The haze-change-axis represents an axis such that the difference between a maximal haze value and a minimal haze value becomes the largest one wherein these haze values are measured when the film is rotated around the axis. In other words, the film is preferably placed so that an orthographic projection to the film-surface of a certain incident light substantially meets the direction of the above-described ridge of the reflector at right angles, wherein the certain incident light allows the scattered light intensity thereof to be maximal and allows an elevation angle of the incident light to the film-surface to be the largest one.

In the present invention, the light diffusion layer may be placed as a single layer or multiple layers, and in the case of multiple layers, each layer thereof may be the same one or a different one and, for example, it may be a layer obtained by applying the fine particle using the resin binder on the surface of the haze film such as the film which scatters an incident light from specific incident angles. The position and conformation of the light diffusion layer are not particularly restricted, and the light diffusion layer may be provided, for example, directly on the surface of the reflector, or may be provided as a part constituting the reflective liquid crystal display of the present invention, or may be incorporated as a film into the reflective liquid crystal display.

The reflective liquid crystal display of the present invention comprises the above-described reflector and the light diffusion layer, and by installing the above-described reflector and the light diffusion layer to a TN type liquid crystal display, STN type liquid crystal display, GH type liquid crystal display and the like, a reflective liquid crystal display having a bright image and an excellent visibility of images is obtained.

Examples of conformation of the reflective liquid crystal display of the present invention include, but are not limited to, the followings;
(, in the followings, "A/B" represents A is followed by B,)
a polarizer/a light diffusion layer/a TN cell/a polarizer/a reflector,
a polarizer/a light diffusion layer/a TN cell/a polarizer/a light diffusion layer/a reflector,
a polarizer/a TN cell/a polarizer/a light diffusion layer/a reflector,
a polarizer/a TN cell/a polarizer/a light diffusion layer/a light diffusion layer/a reflector,
a polarizer/alight diffusion layer/a phase retarder/a STN cell/a polarizer/a reflector,
a polarizer/a light diffusion layer/a phase retarder/a STN cell/a polarizer/a light diffusion layer/a reflector,
a polarizer/a phase retarder/a STN cell/a polarizer/a light diffusion layer/a reflector,
a polarizer/a phase retarder/a STN cell/a polarizer/a light diffusion layer/a light diffusion layer/a reflector,
a light diffusion layer/a GH cell/a reflector,
a GH cell/a light diffusion layer/a reflector,
a light diffusion layer/a polarizer/a TN cell/a polarizer/a reflector and
a light diffusion layer/a polarizer/a phase retarder/a STN cell/a polarizer/a reflector.

In the above-described conformations, the light diffusion layer may be the multiple layers comprising a light diffusion layer which scatters an incident light from specific incident angles and other kind of the above-described light diffusion layer. When two of more light diffusion layers are used, all of them may be light diffusion layers which scatters an incident light from specific incident angles or other kind of the above-described light diffusion layers, or each of them may be respectively a different kind of layer.

In the above-described conformations, one or more optical functional films such as a phase retarder and a vision compensating film may be placed on the upper surface and/or lower surface of the liquid crystal cell.

The reflective liquid crystal display of the present invention and the reflective liquid crystal display obtained by using the light diffusion reflector of the present invention exhibit a bright image and an excellent visibility of images even when the images are viewed from an angle wherein reflection of external light is avoided.

EXAMPLE

The following examples further illustrate the present invention in detail but do not limit the scope thereof.

Example 1

A reflector was obtained by vapor-depositing aluminum thickness of the vapor-deposition: 60 nm) on a plastic sheet (manufactured by Dai Nippon printing Co., Ltd.) of which the surface part has a shape such that triangular prisms having substantially the same form are arranged in adjacent to each other in their ridge directions and the vertical cross sections of the prism to the ridge direction form saw-teeth shape consisting of triangles, and of which the elevation angle is 7.5 degrees and the apex angle is 165 degrees of each triangle and the length of the pitch is 200 $\mu$m, as shown in FIG. 3. Onto the reflector, an acrylic resin having an adhesion property and containing 30% by weight of a pearl pigment (Iriodin: manufactured by Merck Corp.) was applied (thickness: 25 $\mu$m) to place a light diffusion layer.

A light was irradiated, from a direction of an incident angle of −45 degrees from a normal line to the reflector surface, onto the resulted light diffusion reflector on which the light diffusion layer had been thus placed, and the angle-dependent distribution curve of reflected light intensity was measured to find that the reflector has the reflection angle, at which reflection light intensity is maximal, of +21 degrees from the normal line to the reflector surface in the curve. The deviation of the reflection angle with respect to the angle of +45 degrees from the normal line was 24 degrees.

The above-obtained light diffusion reflector on which the light diffusion layer had been thus placed, and a polarizer (SG: manufactured by Sumitomo Chemical Co., Ltd.) were pasted together to obtain a reflective polarizer (in which the conformation thereof is the polarizer/the light diffusion reflector). The resulted reflective polarizer was installed on one side of surface of a STN type cell, and on the opposite side, a phase retarder (SEF: manufactured by Sumitomo Chemical Co., Ltd.) and another polarizer (SG: manufactured by Sumitomo Chemical Co., Ltd.) were installed in this order, to obtain a reflective STN type liquid crystal display (in which the conformation thereof is the polarizer/the phase retarder/the STN liquid crystal cell/the polarizer/the light diffusion reflector). This reflective STN type liquid crystal display was operated, and as a result, the image was bright and a visibility of images was excellent even when the images were viewed from an angle wherein reflection of external light was avoided.

Examples 2

Silver was vapor-deposited (thickness of the vapor-deposition: 60 nm) on the same plastic sheet as used in Example 1 to obtain a reflector. Onto this, an acrylic resin having an adhesion property and containing 15% by weight of cross-linked polystyrene beads having an average diameter of 4 $\mu$m was applied (thickness: 25 $\mu$m) to place a light diffusion layer.

A light was irradiated, from a direction of an incident angle of −45 degrees from a normal line to the reflector surface, onto the resulted light diffusion reflector on which the light diffusion layer had been thus placed, and the angle-dependent distribution curve of reflected light intensity was measured to find that the reflector has the reflection angle, at which reflection light intensity is maximal, of +21 degrees from the normal line to the reflector surface in the curve. The deviation of the reflection angle with respect to the angle of +45 degrees from the normal line was 24 degrees.

The polarizers, the STN type cell, the phase retarder and the light diffusion reflector were installed in the same procedure as in Example 1 except that the light diffusion reflector obtained in this Example 2, on which the light diffusion layer had been thus placed, was used, to obtain a reflective STN type liquid crystal display (in which the conformation thereof is the polarizer/the phase retarder/the STN liquid crystal cell/the polarizer/the light diffusion reflector). This reflective STN type liquid crystal display was operated, and as a result, the image was bright and a visibility of images was excellent even when the images were viewed from an angle wherein reflection of external light was avoided.

Examples 3

In the same procedure as in Example 2, an acrylic resin having an adhesion property and containing 10% by weight of cross-linked polystyrene beads having an average diameter of 1.26 $\mu$m was applied (thickness: 25 $\mu$m) instead of the acrylic resin containing 15% by weight of cross-linked polystyrene beads having an average diameter of 4 $\mu$m, to place a light diffusion layer.

A light was irradiated, from a direction of an incident angle of −45 degrees from a normal line to the reflector surface, onto the resulted light diffusion reflector on which the light diffusion layer had been thus placed, and the angle-dependent distribution curve of reflected light intensity was measured to find that the reflector has the reflection angle, at which reflection light intensity is maximal, of +21 degrees from the normal line to the reflector surface in the curve. The deviation of the reflection angle with respect to the angle of +45 degrees from the normal line was 24 degrees.

The polarizers, the STN type cell, the phase retarder and the light diffusion reflector were installed in the same procedure as in Example 1 except that the resulted light diffusion reflector obtained in this Example 3, on which the light diffusion layer had been thus placed, was used, to obtain a reflective STN type liquid crystal display (in which the conformation thereof is the polarizer/the phase retarder/ the STN liquid crystal cell/the polarizer/the light diffusion reflector). This reflective STN type liquid crystal display was operated, and as a result, the image was bright and a visibility of images was excellent even when the images were viewed from an angle wherein reflection of external light was avoided.

Example 4

A reflector was obtained by vapor-depositing silver (thickness of the vapor-deposition: 60 nm) on a plastic sheet (manufactured by Dai Nippon printing Co., Ltd.) of which the surface part has a shape such that triangular prisms having substantially the same form are arranged in adjacent to each other in their ridge directions and the vertical cross sections of the prism to the ridge direction form saw-teeth shape consisting of triangles, and of which the elevation angle is 7.5 degrees and 90 degrees, the apex angle is 82.5 degrees of each triangle, and the length of the pitch is 30 μm, as shown in FIG. 2. Onto the reflector, an acrylic resin having an adhesion property and containing 12% by weight of cross-linked polystyrene beads having an average diameter of 4 μm was applied (thickness: 25 μm) to place a light diffusion layer.

Figure 10:
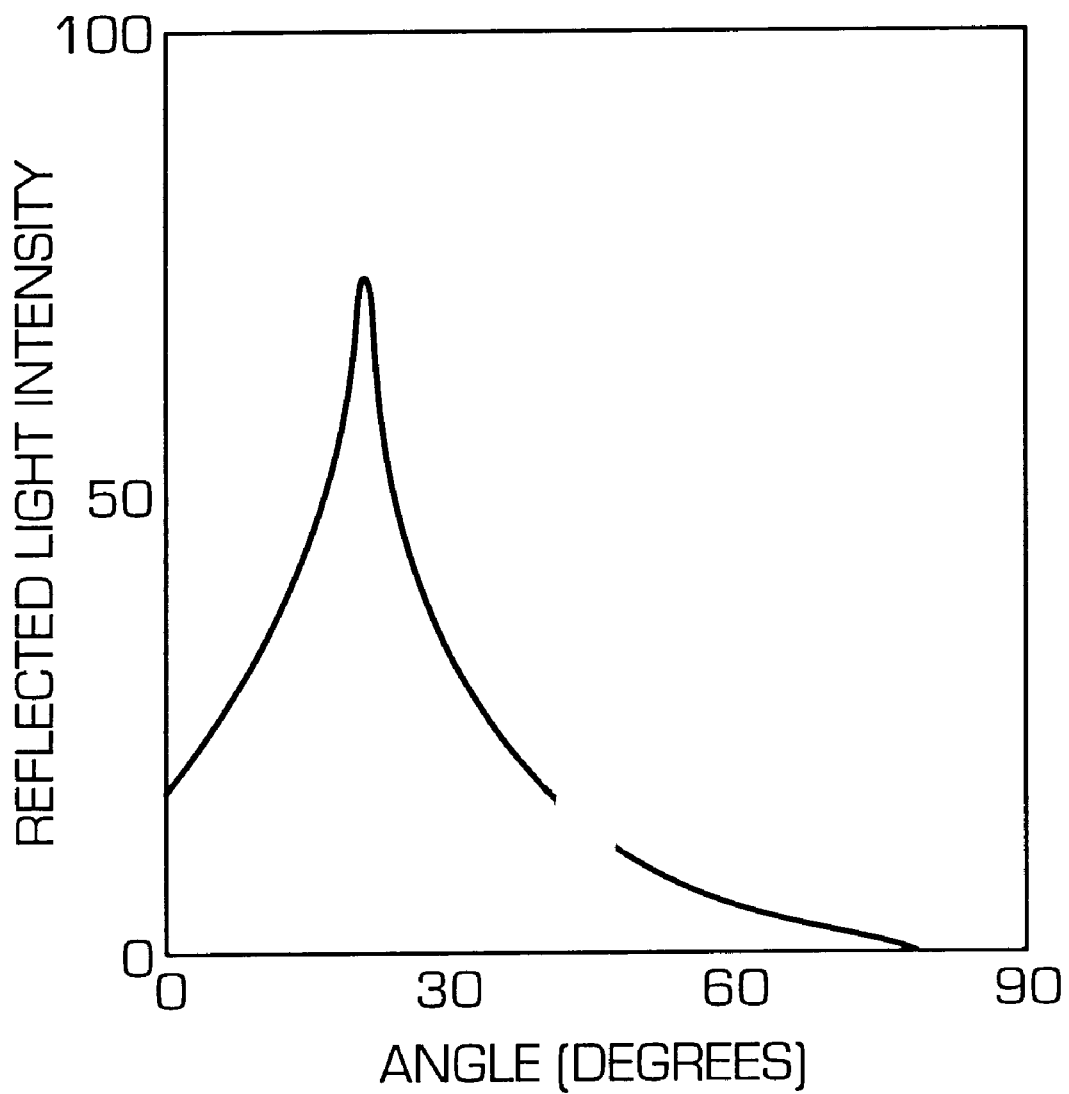
FIG. 10 is an angle-dependent curve of reflected light intensity of a light diffusion reflector obtained in Example 4.

A light was irradiated, from a direction of an incident angle of −45 degrees from a normal line to the reflector surface, onto the resulted light diffusion reflector on which the light diffusion layer had been thus placed, and the angle-dependent distribution curve of reflected light intensity was measured. The resulted angle-dependent distribution curve is shown in FIG. 10. As a result, it is found that the reflector has the reflection angle, at which reflection light intensity is maximal, of +21 degrees from the normal line to the reflector surface in the curve. The deviation of the reflection angle with respect to the angle of +45 degrees from the normal line was 24 degrees.

The polarizers, the STN type cell, the phase retarder and the light diffusion reflector were installed in the same procedure as in Example 1 except that the resulted light diffusion reflector obtained in this Example 4, on which the light diffusion layer had been thus placed, and polarizers (SJ:manufactured by Sumitomo Chemical Co., Ltd.) were used, to obtain a reflective STN type liquid crystal display (in which the conformation thereof is the polarizer/the phase retarder/the STN liquid crystal cell/the polarizer/the light diffusion reflector). This reflective STN type liquid crystal display was operated. As a result, the image was bright, a visibility of images was excellent and a Moiré pattern was not observed even when the images were viewed from an angle wherein reflection of external light was avoided.

Example 5

Figure 11:
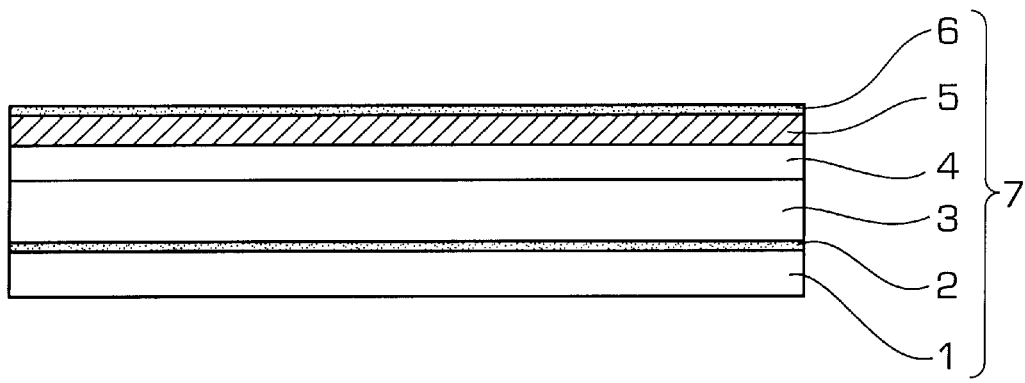
FIG. 11 is a longitudinal sectional view showing structure of a reflective STN liquid crystal display obtained in Example 5.
Figure 12:
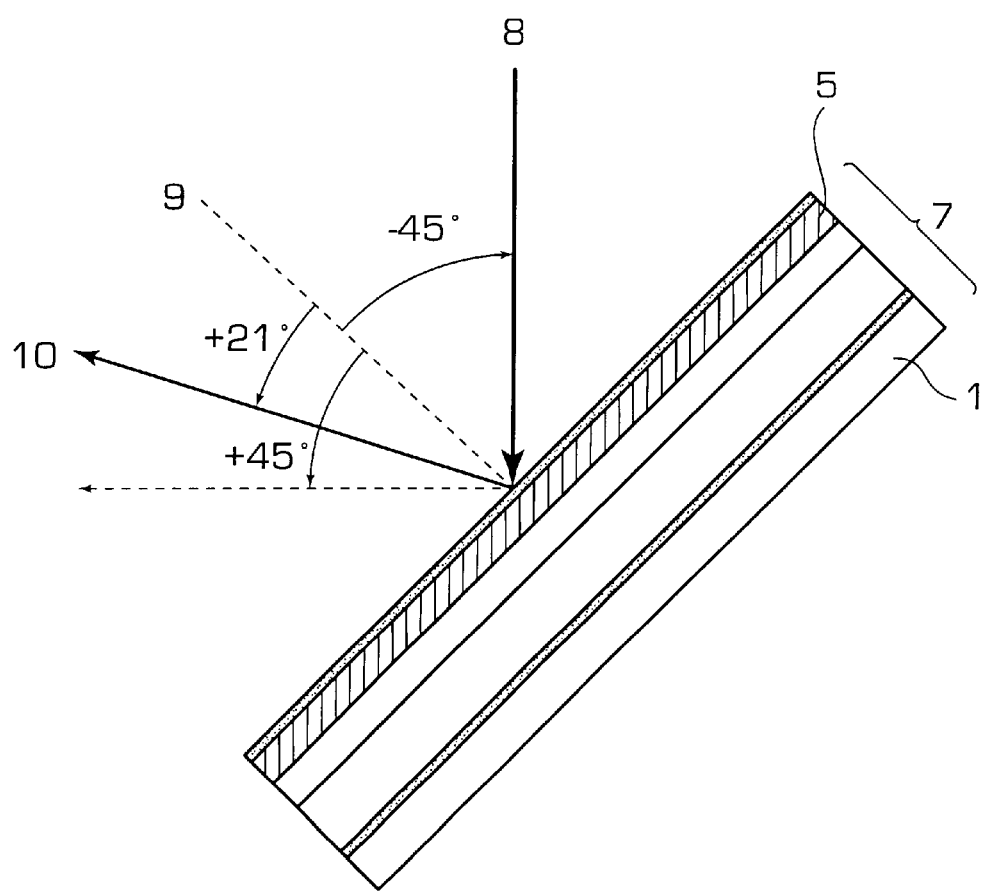
FIG. 12 is a longitudinal sectional view explaining arrangement of a light diffusion layer in a reflective STN liquid crystal display obtained in Example 5.

A reflector was obtained by vapor-depositing silver thickness of the vapor-deposition: 60 nm) on the same plastic sheet as used in Example 4. This reflector 1, and layers and plates as described below were placed in the order as shown in FIG. 11. That is, a polarizer 2 (SJ: manufactured by Sumitomo Chemical Co., Ltd.) and the reflector 1 were installed in this order on one side of surface of a STN cell 3 via an acrylic adhesive, and on the opposite side, a phase retarder 4 (SEF: manufactured by Sumitomo Chemical Co., Ltd.), a light diffusion layer 5 in the form of a film which scatters an incident light from specific incident angles ("LUMISTY" LCY-0555: manufactured by Sumitomo Chemical Co., Ltd.) and another polarizer 6 (SJ: manufactured by Sumitomo Chemical Co., Ltd.) were placed in this order to obtain a reflective STN type liquid crystal display 7 (in which the conformation thereof is the polarizer/the light diffusion layer/the phase retarder/the STN liquid crystal cell/the polarizer/the reflector). This reflective STN type liquid crystal display 7 was installed as shown in FIG. 12, so that the reflector 1 could have a maximal value of reflected light intensity in a direction 10 at an angle of +21 degrees from a normal line 9 to the reflector 7 when an incident light 8 was irradiated on the reflector 7 from a direction at an angle of −45 degrees from the normal line 9, and the light diffusion layer 5 in the form of a film could scatter the incident light 8. This reflective STN type liquid crystal display was operated. As a result, the image was bright, a visibility of images was excellent and a Moiré pattern was not observed even when the images were viewed from the direction 10 at an angle wherein reflection of external light was avoided.

Example 6

A reflector was obtained by vapor-depositing silver (thickness of the vapor-deposition: 60 nm) on the same plastic sheet as used in Example 4. Onto this, a light diffusion layer in the form of a film which scatters an incident light from specific incident angles ("LUMISTY" LCY-0555: manufactured by Sumitomo Chemical Co., Ltd.) was placed so that a direction of the haze-change-axis of the haze film LUMISTY LCY-0555 is adjusted to that of a ridge direction of the reflector, to obtain a light diffusion reflector.

A glass plate having a thickness of 1.1 mm was placed on the resulted light diffusion reflector, and then, a light was irradiated from direction of an incident angle of −45 degrees to a normal line onto the light diffusion reflector. The angle-dependent distribution curve of reflected light intensity was measured to find that the reflector has the reflection angle, at which reflection light intensity is maximal, of +21 degrees from the normal line to the reflector surface in the curve. The deviation of the reflection angle with respect to the angle of +45 degrees from the normal line was 24 degrees.

The light diffusion reflector could reflect the incident light with a large intensity and, therefor, when a liquid crystal display obtained by using this reflector is operated, the image is bright, a visibility of images is excellent and a Moiré pattern is not observed even when the images are viewed from an angle wherein reflection of external light is avoided.

What is claimed is:

1. A reflective liquid crystal display comprising, in the following order:

(II) a reflector;

(I) at least one light diffusion layer; and (III) a liquid crystal cell, wherein said light diffusion layer comprises: (i) inorganic fine particles and/or organic fine particles and a resin binder; or (ii) a film which scatters a part of incident light from angles tilted about 25 degrees to about 60 degrees from normal line to the reflector face and allows incident light from other angles to transmit, and said reflector having (1) one or two light reflection angles which exhibit maximums in an angle-dependent distribution curve of reflected light intensity which is generated when light is irradiated on the reflector surface from a direction at an angle of −45 degrees from a normal line to the reflector surface, in which at least one angle exhibiting the maximum deviates by at least 5 degrees from the angle of +45 degrees from the normal line to the reflector surface and (2) an elevation/depression angle of between 2.5 degrees and 10 degrees.

2. The reflective liquid crystal display according to claim 1, wherein said light diffusion layer comprises said (i) inorganic fine particles and/or organic fine particles and a resin binder.

3. The reflective liquid crystal display according to claim 1, wherein said light diffusion layer comprises said (ii) film.

4. The reflective liquid crystal display according to claim 3, wherein the light diffusion layer is placed so that a direction of a haze-change-axis of the film which scatters a part of incident light from angles tilted about 25 degrees to about 60 degrees from normal line to the reflector surface and allows incident light from other angles to transmit is adjusted to a ridge direction of the reflector.

5. The reflective liquid crystal display according to claim 1, wherein the reflector is a reflector obtained by providing a reflection layer on a substrate.

6. The reflective liquid crystal display according to claim 1, wherein the reflector comprises a metal plate having high reflectance.

7. The reflective liquid crystal display according to claim 1, wherein the reflector is a reflector of which a surface part has a shape such that triangular prisms are arranged in adjacent to each other in their ridge directions and the vertical cross sections of the prisms to the ridge direction form a saw-teeth shape consisting of triangles, and of which an angle of elevation of each triangle is 2.5 degrees or more.

8. The reflective liquid crystal display according to claim 1, wherein the reflector is a reflector of which a surface part comprises depressions and/or projections which are densely formed over the entire reflector surface, with each of depression and/or projection having an asymmetric cross section at least in one direction, in which the depressions and/or projections have substantially the same shape and are arranged in substantially the same direction one another, and of which an elevation angle for the projection or a depression angle for the depressions, is between 2.5 degrees and 90 degrees.

9. The reflective liquid crystal display according to claim 1, wherein the reflector is a reflector of which a surface part has a shape such that pyramids are clustered together with their base-sides being in contact with each other, all the pyramids have substantially the same shape and are arranged in the same direction one another, and the vertical cross sections of the pyramids to their-bases including the highest points of each pyramid arranged in the same direction form a saw-teeth shape consisting of congruent or similar triangles, and of which an elevation angle of each triangle is 2.5 degrees or more.

10. The reflective liquid crystal display according to claim 1, wherein the light diffusion layer is directly placed on the surface of the reflector.

11. The reflective liquid crystal display according to claim 10, wherein the light diffusion layer is directly placed on the surface of a reflector obtained by providing a reflection layer on a substrate.

12. The reflective liquid crystal display according to claim 1, wherein the display has a polarizer.

13. The reflective liquid crystal display according to claim 1, wherein the display has a liquid crystal cell selected from a twisted nematic cell, super twisted nematic cell and guest host type cell.

14. A light diffusion reflector comprising:

(I) at least one light diffusion layer; and (II) a reflector, said light diffusion layer being placed directly on said reflector and said reflector having one or two reflection angles which exhibit maximums in an angle-dependent distribution curve of reflected light intensity which is generated when light is irradiated on the reflector surface from a direction at an angle of −45 degrees from a normal line to the reflector surface, in which at least one angle exhibiting the maximum deviates by at least 5 degrees from the angle of +45 from the normal line to the reflector surface, wherein the light diffusion layer comprises an inorganic fine particle and/or an organic fine particle, and a resin.

15. A light diffusion reflector comprising:

(I) at least one light diffusion layer; and (II) a reflector, said light diffusion layer being placed directly on said reflector and said reflector having one or two reflection angles which exhibit maximums in an angle-dependent distribution curve of reflected light intensity which is generated when light is irradiated on the reflector surface from a direction at an angle of −45 degrees from a normal line to the reflector surface, in which at least one angle exhibiting the maximum deviates by at least 5 degrees from the angle of +45 degrees from the normal line to the reflector surface, wherein the light diffusion layer comprising a layer which scatters a part of incident light from angles tilted about 25 degrees to about 60 degrees from normal line to the reflector surface and allows incident light from other angles to transmit.

16. The light diffusion reflector according to claim 14 or claim 15, wherein the reflector is a reflector obtained by providing a reflection layer on a substrate.

17. The light diffusion reflector according to claim 15, wherein the light diffusion layer is placed so that a direction of a haze-change-axis of the film which scatters a part of incident light from angles tilted about 25 degrees to about 60 degrees from normal line to the reflector surface and allows incident light from other angles to transmit is adjusted to a ridge direction of the reflector.

* * * * *